United States Patent [19]

Okamoto et al.

[11] 3,875,808
[45] Apr. 8, 1975

[54] FEED BAR DRIVING DEVICE OF TRANSFER PRESS

[75] Inventors: Yukiro Okamoto; Daisaku Tsukata; Fujimaro Kamiya, all of Osaka, Japan

[73] Assignee: Hitachi Shipbuilding and Engineering Co., Ltd., Osaka, Japan

[22] Filed: Dec. 6, 1973

[21] Appl. No.: 422,536

[52] U.S. Cl. .................................. 74/29; 214/1 BB
[51] Int. Cl. ............................................. F16h 19/04
[58] Field of Search ........ 74/29, 422; 214/1 BB, 1 B

[56] References Cited
UNITED STATES PATENTS

| | | | |
|---|---|---|---|
| 3,022,373 | 2/1962 | Levine et al. | 74/29 |
| 3,668,941 | 6/1972 | Canner | 214/1 BB |
| 3,738,503 | 6/1973 | Wallis | 214/1 BB |
| 3,753,489 | 8/1973 | Tomioka et al. | 214/1 BB |

*Primary Examiner*—Wesley S. Ratliff, Jr.
*Attorney, Agent, or Firm*—Farley, Forster and Farley

[57] ABSTRACT

The present invention relates to transfer press, and more particularly to feed bar driving device of solid transfer press constructed to make feed bars for attaching work supports disposed on both sides of work transferring route carry out three-dimensional motion composed of work clamping motion, lifting motion, and transferring motion.

6 Claims, 18 Drawing Figures

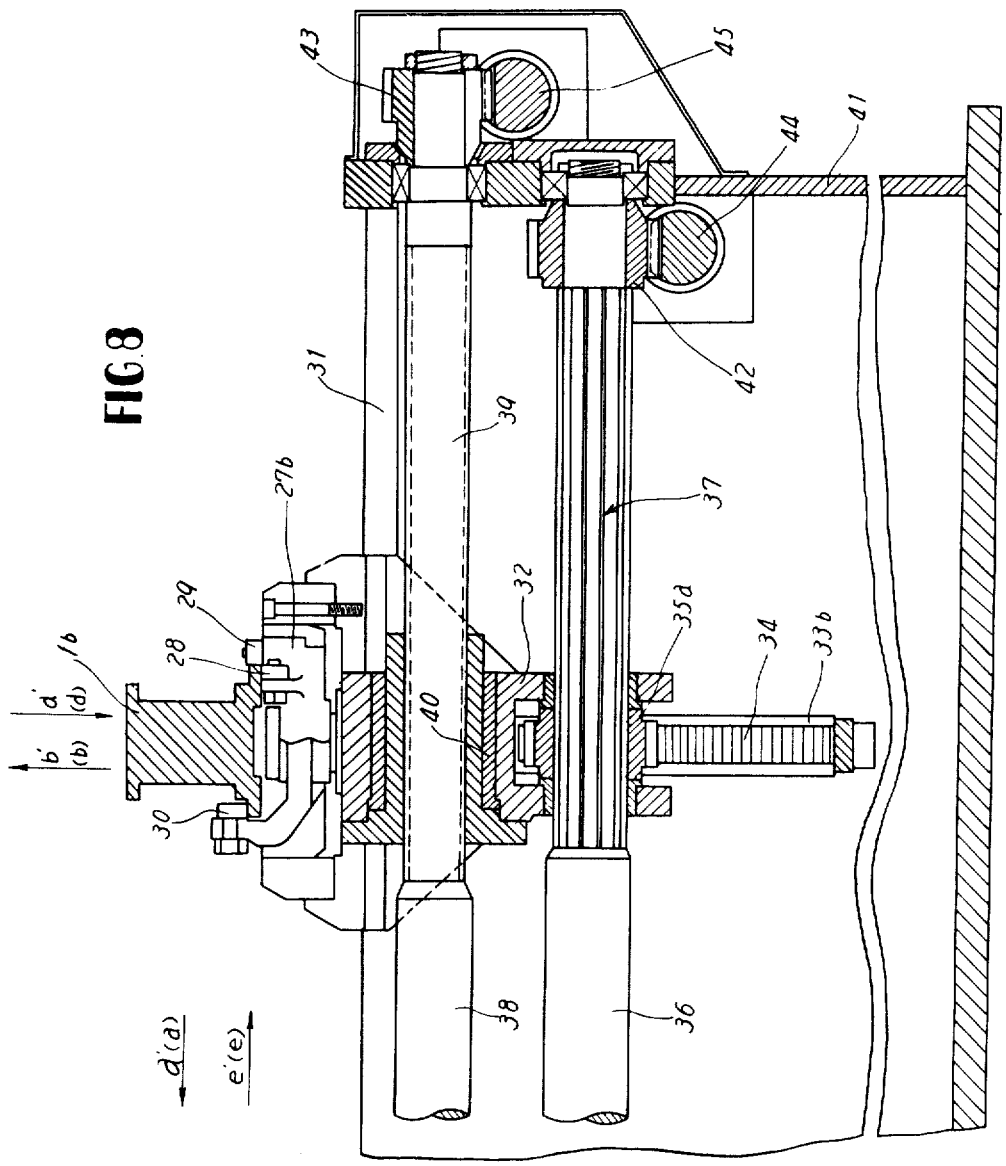

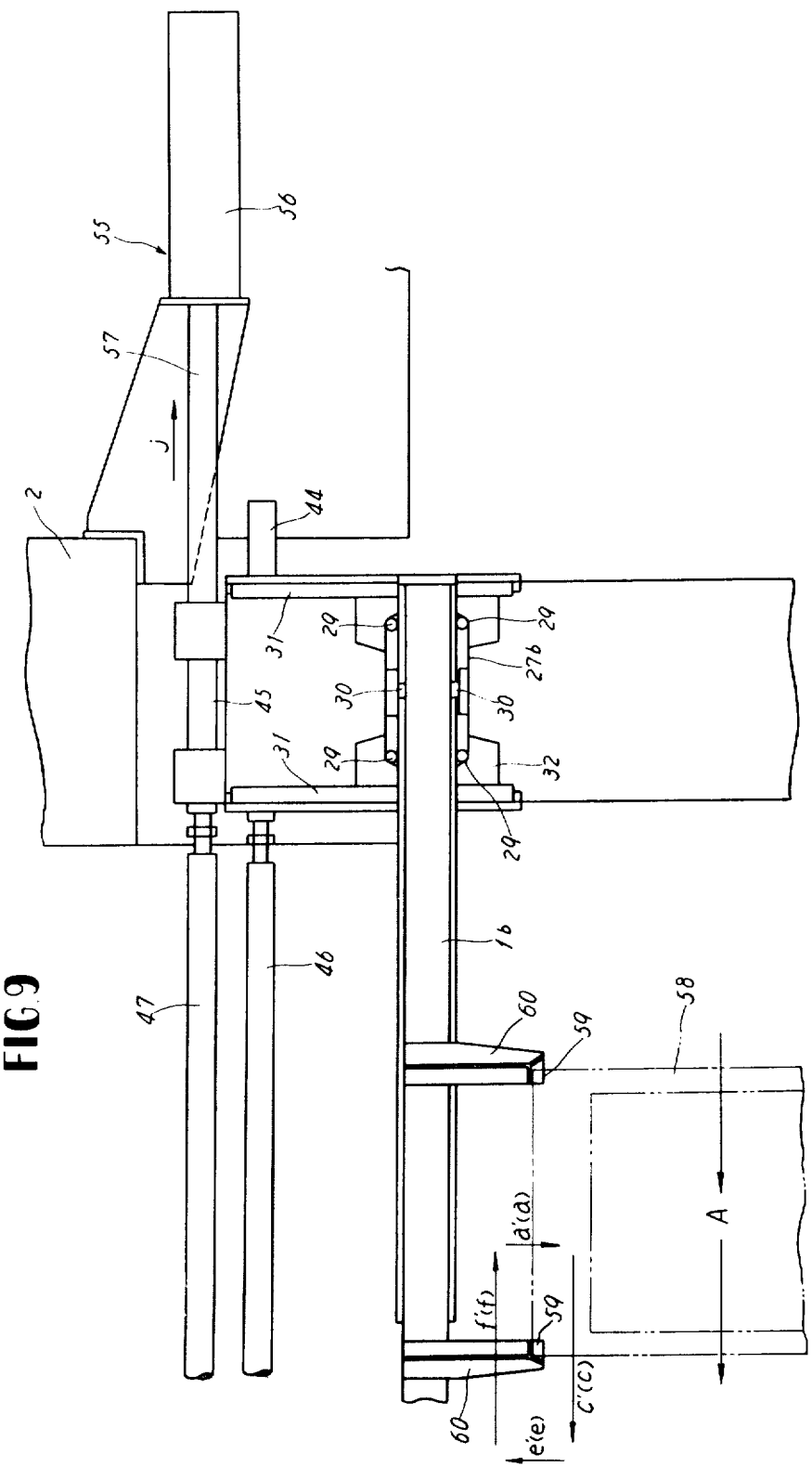

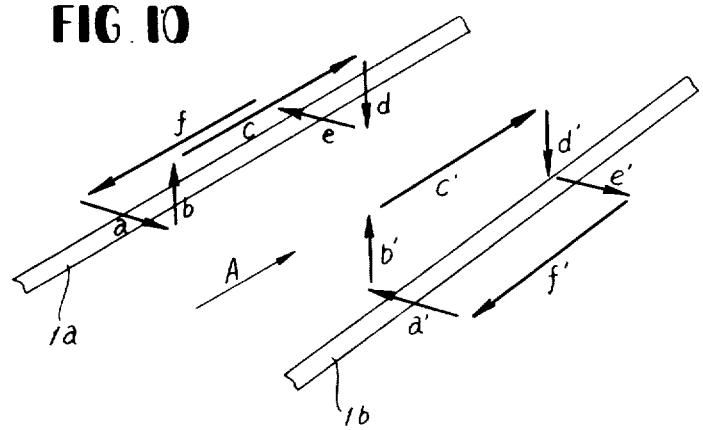
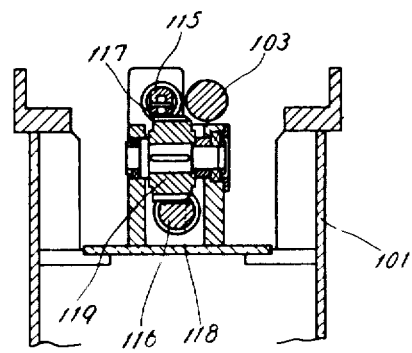
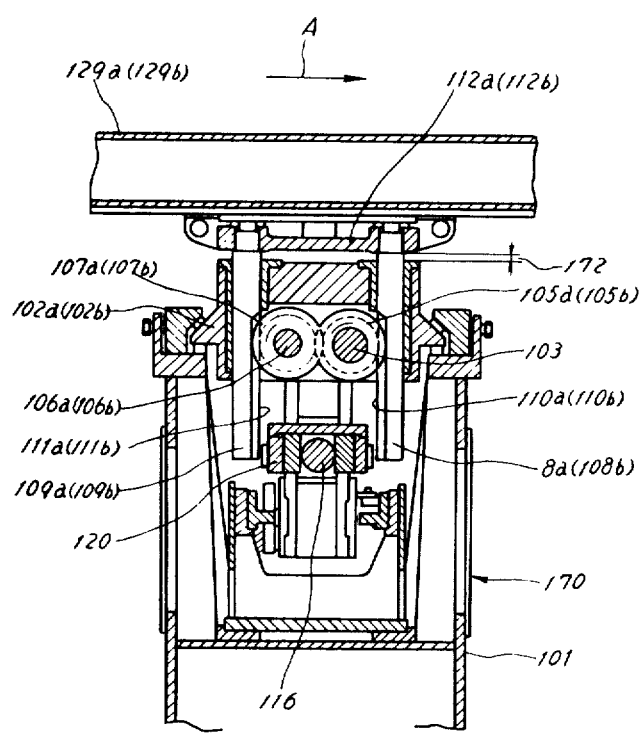
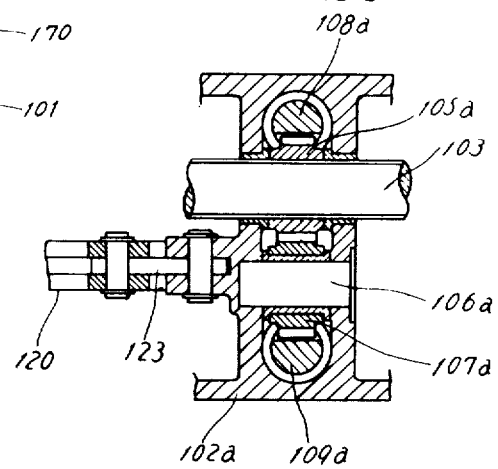

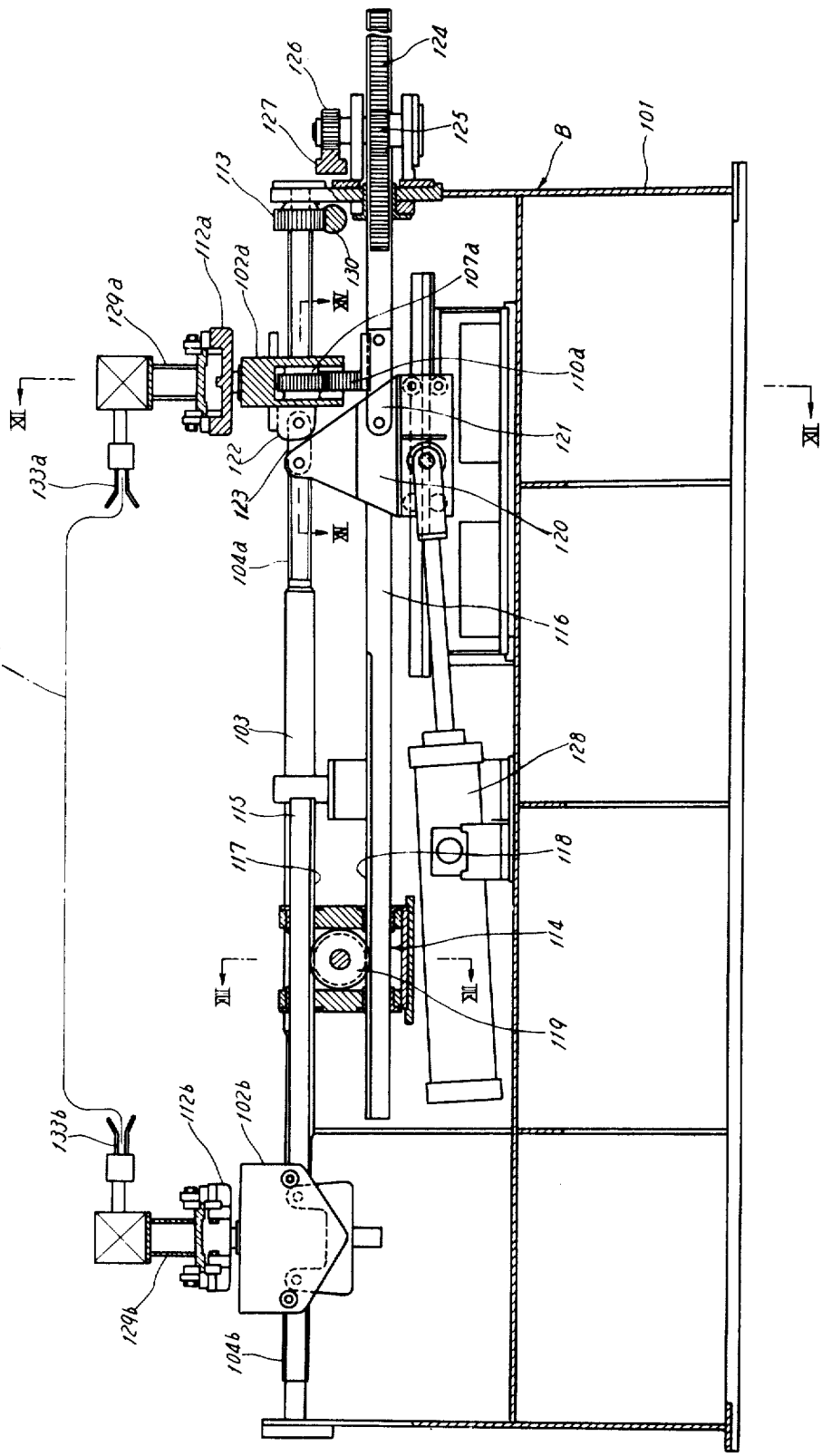

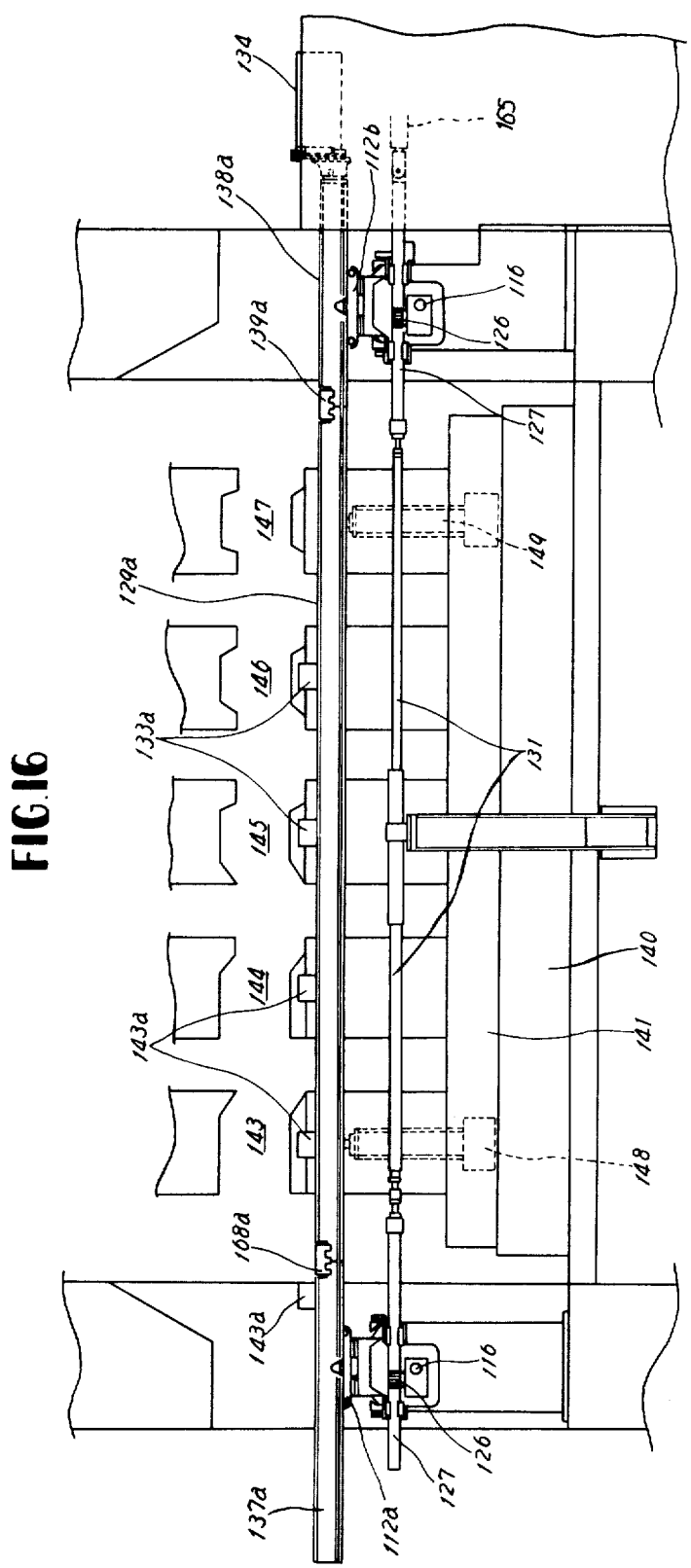

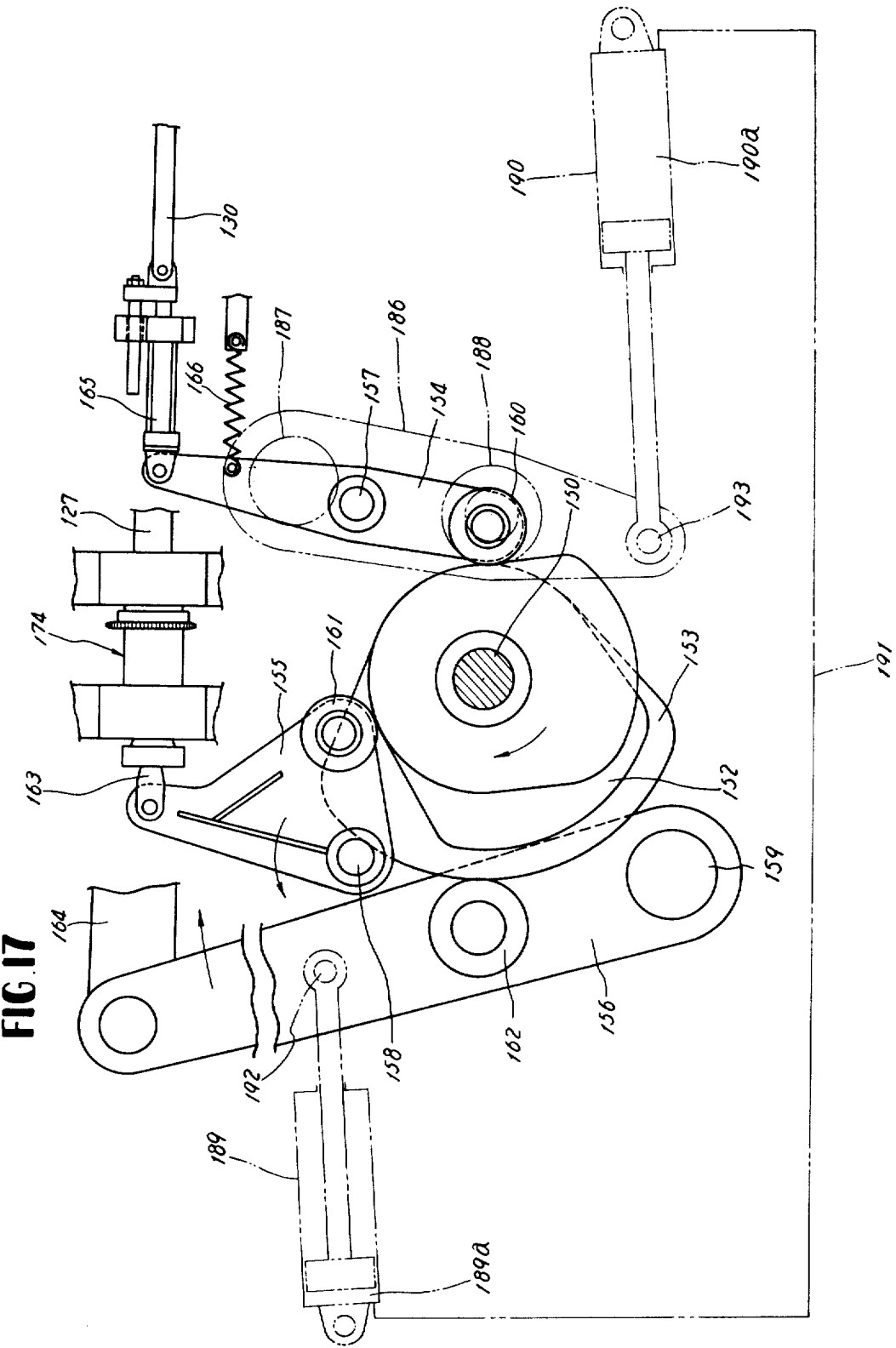

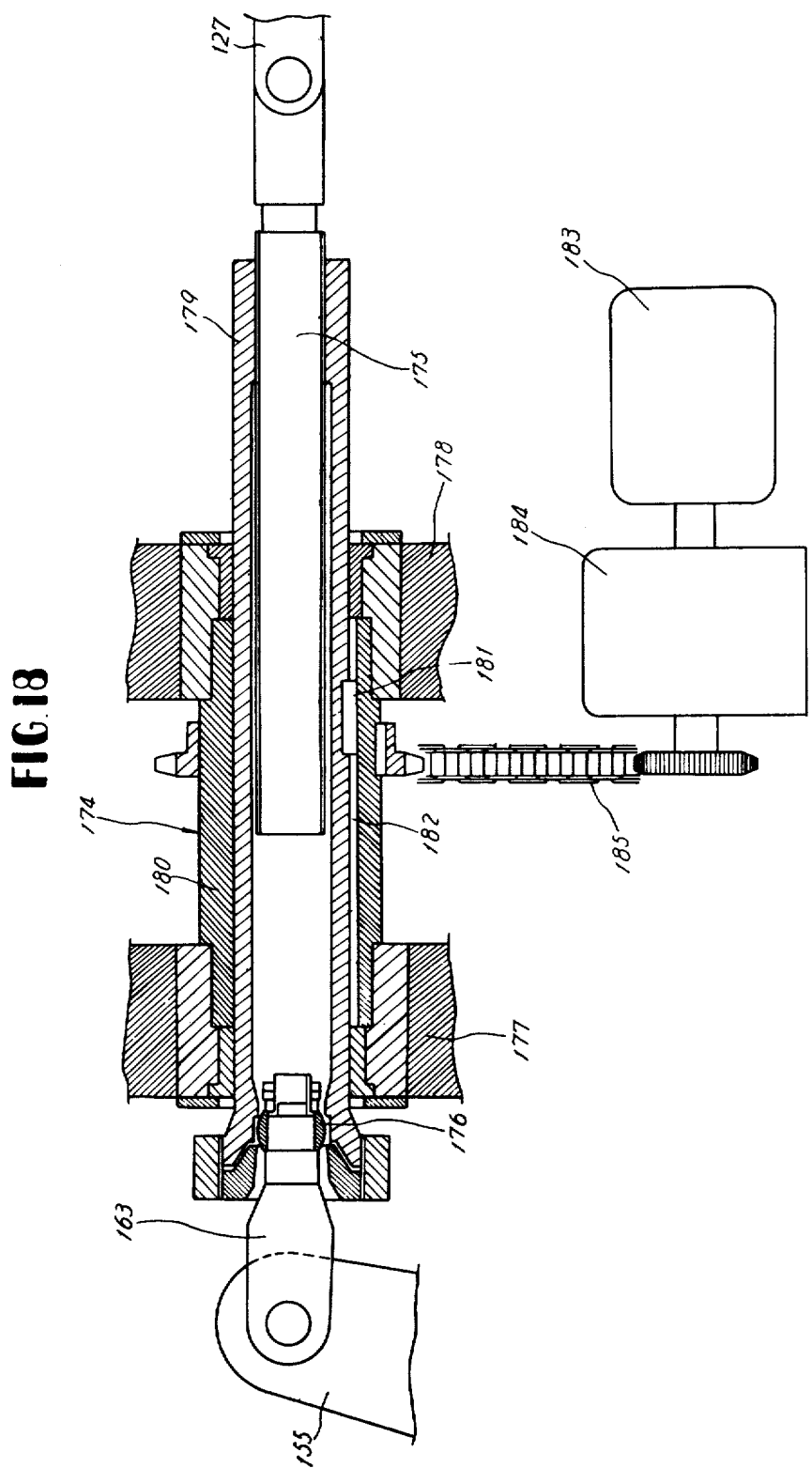

FEED BAR DRIVING DEVICE OF TRANSFER PRESS

In general, feed bar driving device of transfer press of this type is provided in a plurality of positions in the work transferring route with means for moving the work up-and-down and means for moving a pair of feed bars to approach to or retreat from each other, and at one end of the route with means for reciprocating the feed bars in the direction of the route. On the other hand, as the source of each motion of the feed bars, it is preferable to use cam and cam follower lever, because with them the relation of stroke-speed can be set as desired. But, as such cam device is apt to become of a larger size, when such cam device is used for each of the means mentioned above, the whole apparatus will become of a large size. Further, as it is required to supply distributedly the rotary power for driving cam device to each of the means, rotary shaft must be disposed extendedly along the work transferring route, so that there is a problem also in the point of safety. And, as there are a number of cam devices, it is difficult to adjust the phase thereof and deviation may be caused easily. And, when it is desired to extend the route to increase the number of process, the rotary power transmitting system must be extended and also new cam device must be added.

The present invention is to settle all the problems as mentioned above by disposing the cam device serving as the driving source for the three motions of the feed bars at one end of the route and by a number only corresponding to the number of the motions, and constructing to transmit the driving power from the cam device to the means for driving the feed bars up-and-down and the means for driving the feed bars to approach to and retreat from each other through two reciprocating bar-like bodies arranged along the route.

Namely, the feed bar driving device for transfer press according to the present invention comprises a pair of carriages reciprocatable across the work transferring route in prescribed position in the direction of the route; bases mounted respectively on the carriages to be movable up-and-down; carriage driving means for moving the carriages oppositely to approach to and retreat from each other and having driven pinion gears only at one side of said route; pinion gear held on each of said carriages to be only rotatable and engageable with vertical rack gears connected to the side of said bases; rotary shaft disposed in the direction across the route, fitted thereon with pinion gears to both the carriages to be slidable only axially and having driven gears only on the same side as the side of said driven pinion gears; two rack gears disposed on one side of said route to be reciprocatable in the direction of the route and meshed with each of said driven gears; carriages movable in the direction of said route, connected together through the one ends on the same sides of a pair of the feed bars supported respectively on both said bases to be reciprocatable only in the direction of said route and the means permitting the feed bars to move up-and-down and to move to approach to and retreat from each other; and cams and cam follower levers disposed at one end of said route and driven with driving shaft disposed in the direction across the route to reciprocate the carriages and said two rack gears.

According to such driving device of the present invention, as cam device, only three cam devices corresponding respectively to each of the three motions of the feed bars are disposed at one end of the route, means disposed in several places in the route may be constructed compactly, so that the device may be made compactly as the whole, and also the phase adjustment may be carried out extremely simply and moreover deviation is seldom brought about. And, to means disposed in several places in the route is transmitted driving power from the cam device at the one end of the route through two reciprocating rack gears, so that safety is larger than when rotary shaft exists and increasing work for extending the route to increase the number of process is easier.

Other several features and effects of the present invention will be understood readily from the explanation of the preferable embodiments of the present invention described hereunder referring to the illustrations, in which:

FIG. 1 to 10 show the first embodiment of the present invention.

FIG. 1 is a side elevation of the whole device.

FIG. 2 is a diagrammatic plan showing the part of the work transferring route.

FIG. 3 is a longitudinally sectioned front view of the part of the driving device for transference.

FIG. 4 is a longitudinally sectioned side elevation thereof.

FIG. 5 is a plan thereof.

FIG. 6 is a cross sectional plan of the part of driving cam shaft.

FIG. 7 is a front view of the part of the driving device for moving up-and-down and widthwise, partially broken.

FIG. 8 is a longitudinally sectioned side elevation of the principal part thereof.

FIG. 9 is a plan thereof.

FIG. 10 is an oblique view for illustrating the motion route of the feed bars.

FIGS. 11 to 17 show the second embodiment of the present invention.

FIG. 11 is a block diagram of a structure (170).

FIG. 12 is a section taken on the line XII—XII in FIG. 11.

FIG. 13 is a section taken on the line XIII—XIII in FIG. 11.

FIG. 14 is a section taken on the line XIV—XIV in FIG. 11.

FIG. 15 is a general plan of the device of the second embodiment.

FIG. 16 is a side elevation of FIG. 15.

FIG. 17 is a side elevation of the transmission part.

FIG. 18 is a section showing the detail of the transmission means changeable in length.

EMBODIMENT 1

In FIGS. 1 and 2, 1a, 1b are feed bars laid on both sides of a route A for transferring work parallel with the route A. Along the route A are set successively from the beginning end thereof twelve process locations from the 1st process location B to the 12th process location M at equal intervals, and out of them, the 2nd, 5th, 8th, 11th process locations C F I L are respectively in the positions of uprights 2 and serve as suspension (relay) process. The last 12th process location M is situated on delivery path 4 comprising gravity roller conveyer 3, the work having been transferred as far as to this location is delivered out of the equipment by means of the delivery path 4.

Both said feed bars 1a 1b are three-dimensional movable bodies feasible to carry out the following motions successively, as shown in FIG. 10 in the order of approaching motions $a$, $a'$ to the route A, elevating motions $b$, $b'$, transferring motions $c$, $c'$ in the direction of the route A, descending motions $d$, $d'$, retreating motions $e$, $e'$ from the route A, and return back motions in direction reverse to the transferring motion, and a driving device for carrying out the transferring motions $c$, $c'$ and the return back motions $f$, $f'$ out of the motions mentioned above, will be explained.

Figure 3:
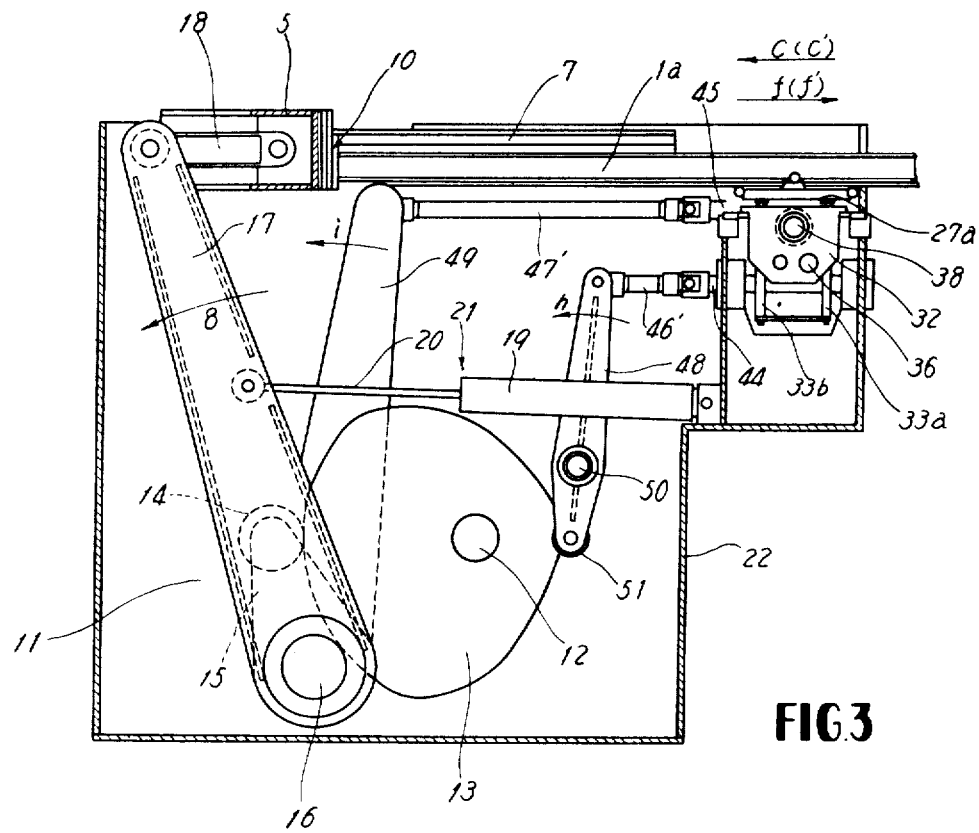
Figure 4:
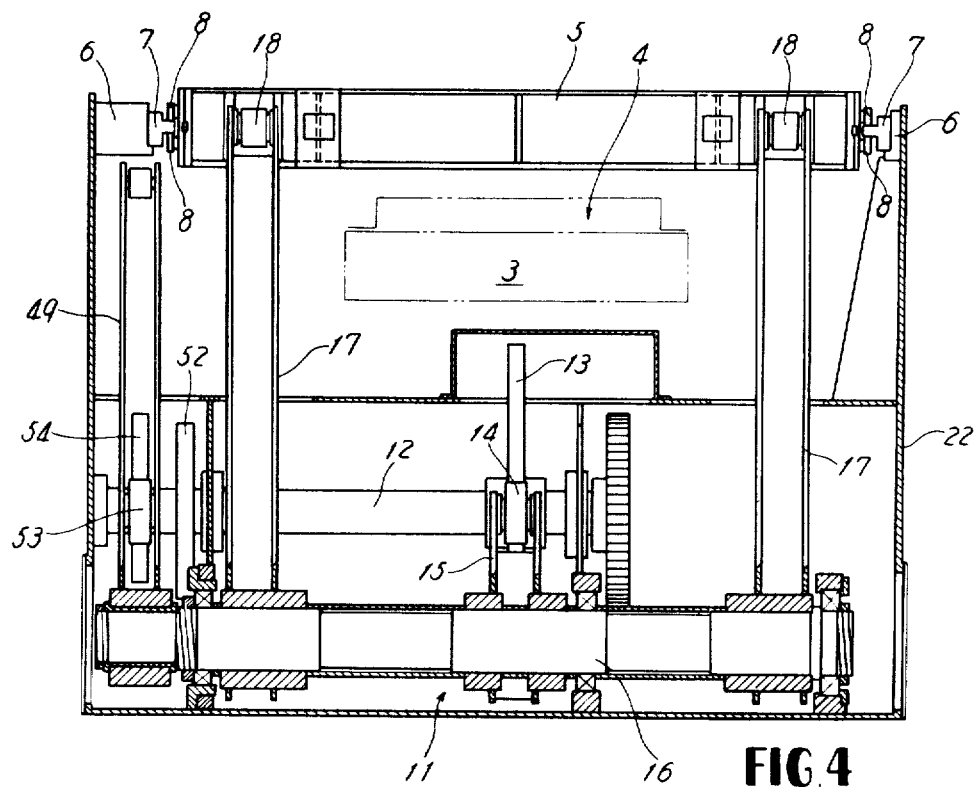
Figure 5:
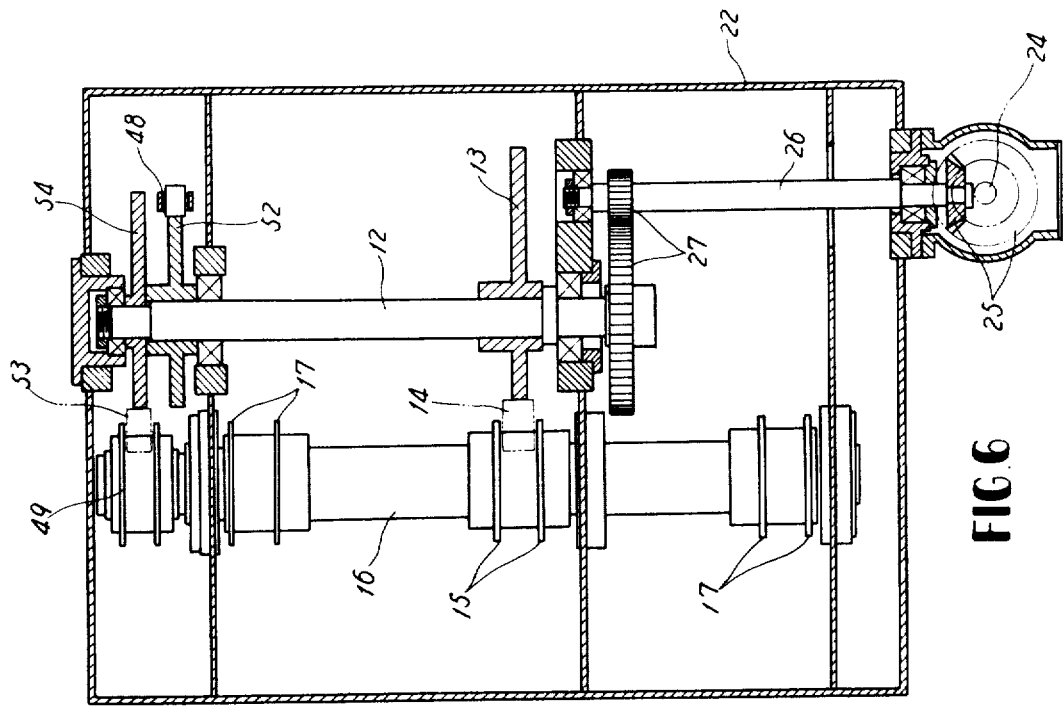

This driving device comprises a carriage 5 reciprocating at the end of the route A and above the delivery path 4, and a cam device for reciprocating it. The carriage 5 is propped movably with rails 7 laid on both side frames 6, the detailed structure thereof is shown in FIGS. 3-5. In these illustrations, 8 is guide rollers holding the rail 7 therebetween, 9 is roller to control the lateral positioning of the rail 7. To said carriage 5 are connected the extreme ends of both the feed bars 1a, 1b, and for this connection, universal coupling, for example, such as Oldham's coupling is used to make it possible to carry out the elevating and descending motions $b$, $b'$, $d$, $d'$, and the approaching and retreating motions $a$, $a'$, $e$, $e'$, with respect to the carriage 5. Cam device 11 for driving the carriage 5 is constructed with a cam 13 mounted securely on a cam shaft 12, a oscillating lever 15 journaled with a cam follower roller 14, a pair of arms 17 attached securedly near both ends of a rotary shaft 16 interlocked with the oscillating lever 15, links 18 connecting the carriage 5 and each of the arms 17 together, and a cylinder device 21 journaling cylinder body 19 on stationary frame 22 to urge said cam follower roller 14 against the cam 13 while journaling piston stem 20 on one of the arms 17. Particularly as shown in FIG. 4, the pair of arms 17 are positioned at both sides of the gravity roller conveyer 3, and the cam shaft 12, cam 13, rotary shaft 16, oscillating lever 15 and the like are disposed below the conveyor 3.

As constructed as described above, the pair of the arms 17 may be oscillated forcedly in the direction of the arrow g by rotating the cam 13 through the cam shaft 12, and the transferring motions $c$, $c'$ may be imparted to both the feed bars 1a, 1b through the carriage 5, furthermore by rotating the cam 13, the arms 17 may be returned back with a traction power generated by the cylinder device 21 in the direction reverse to the arrow g and thereby the return back motions $f$, $f'$ may be imparted to the feed bars 1a, 1b through the carriage 5. When the cylinder device 21 is used as the power source of the return back motions $f$, $f'$ like this, it is convenient because the feed bars 1a, 1b may be be reciprocated while the cam 13 is not rotated and also the feed bars 1a 1b may be remained standstill in spite of the rotation of the cam 13.

Figure 1:
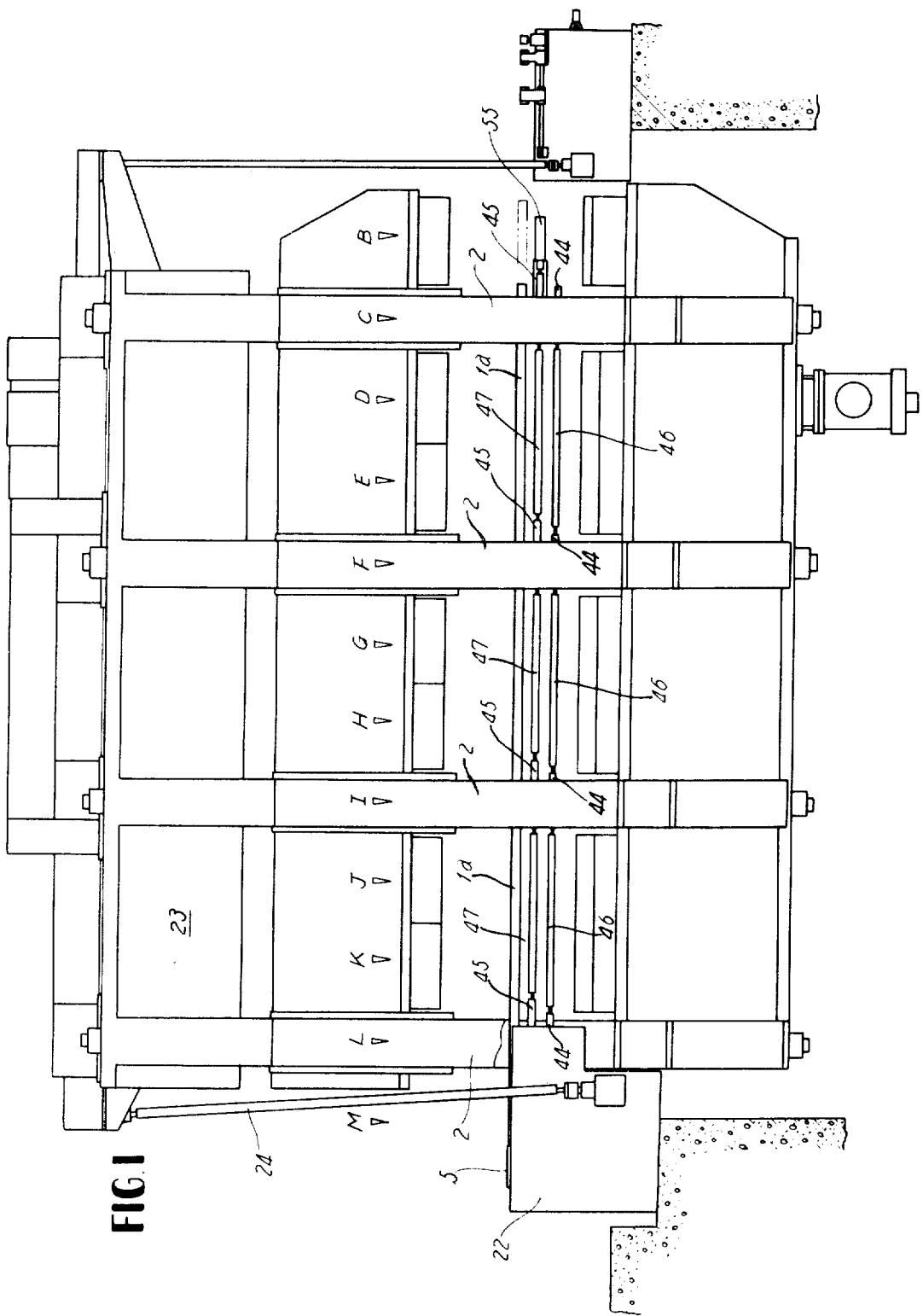

The power transmitting system for the cam shaft 12 will be explained, as shown in FIG. 1, a vertical shaft 24 interlocked with a main shaft within crown 23 supported by each of the uprights 2 is extended from a position above the end of the route A and an intermediate transverse shaft 26 interlocked with the vertical shaft 24 through bevel gears 25 is born on the stationary frame 22, and by connecting interlockedly the intermediate transverse shaft 16 and the cam shaft 12 through reduction gears 27, the cam 13 is adapted to be driven with a prescirbed timing with respect to press work.

Figure 2:
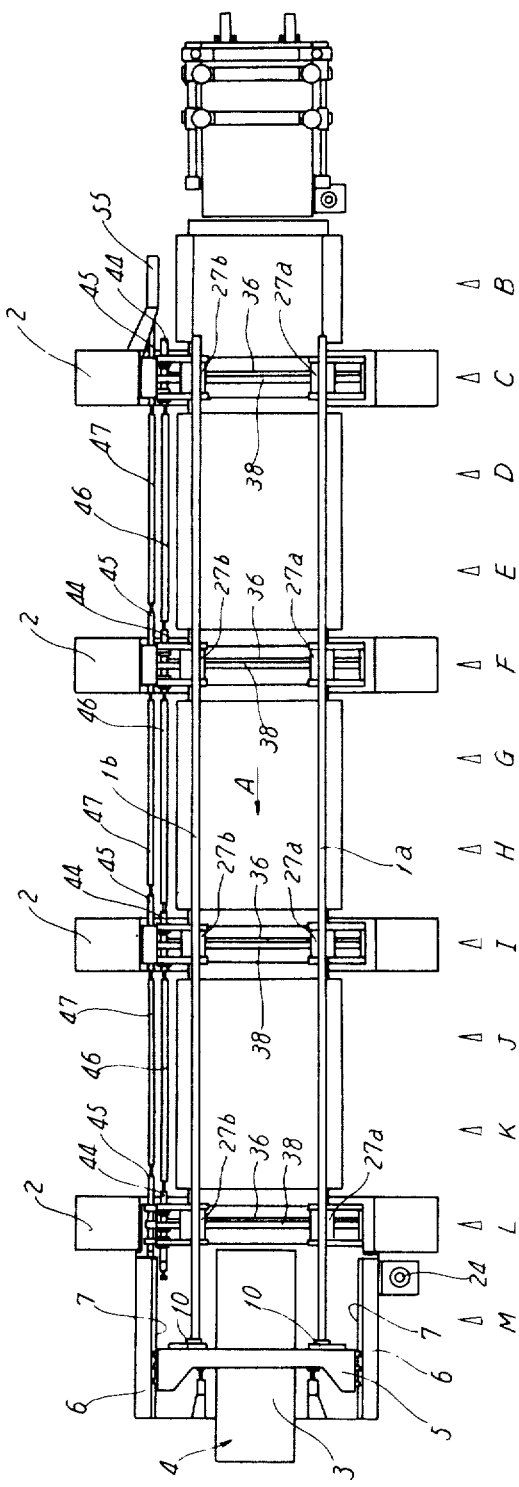
Figure 6:
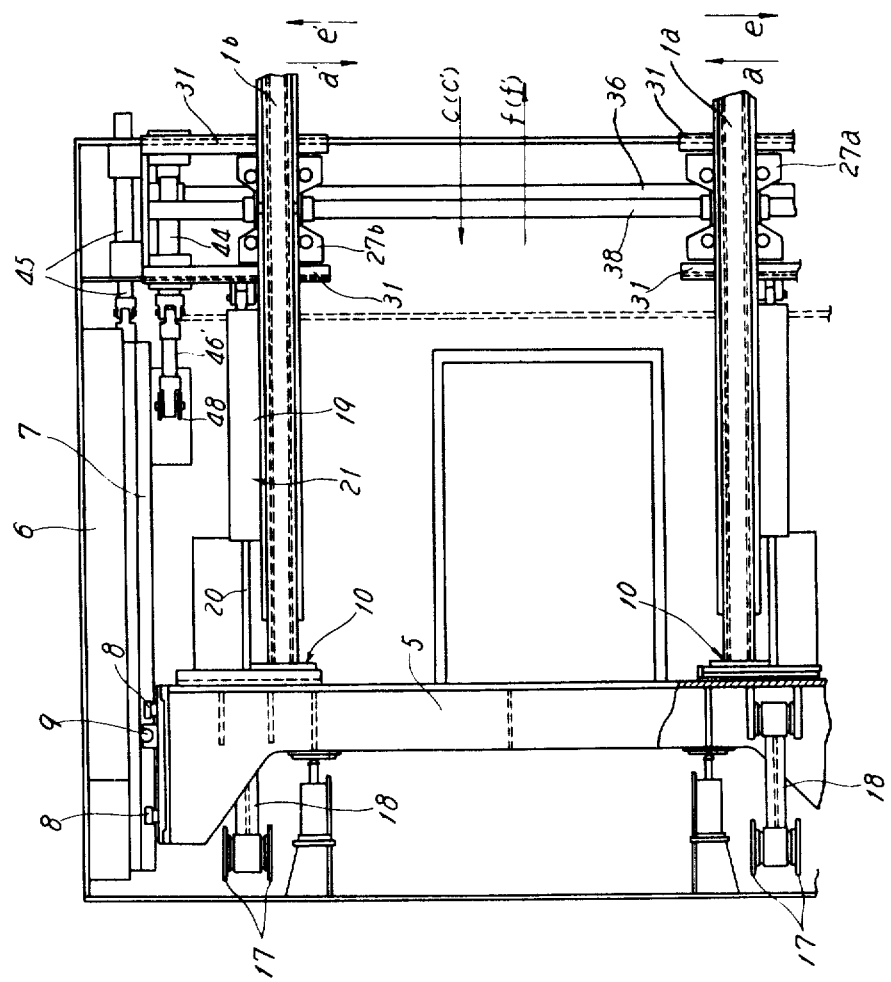
Figure 7:
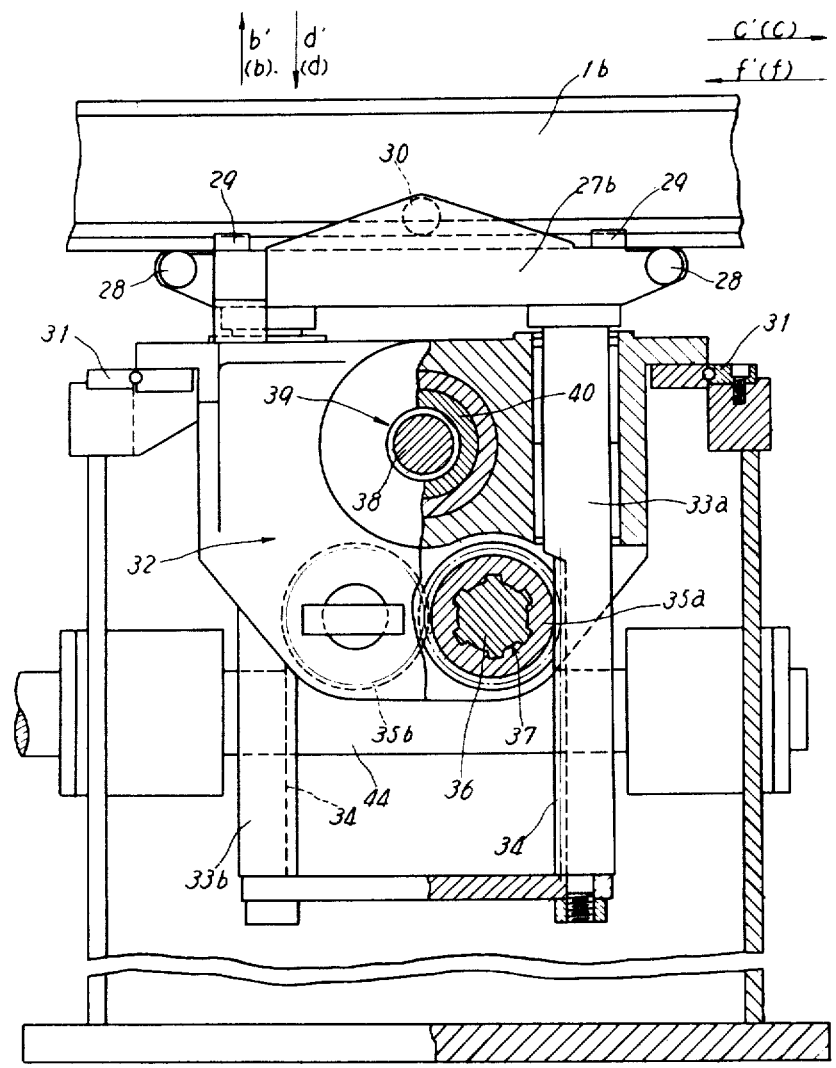

And now, a driving device for imparting the approaching and retreating motions $a$, $a'$, $e$, $e'$, and the elevating and descending motions $b$, $b'$, $d$, $d'$ to the feed bars 1a, 1b will be explained. Each of the feed bars 1a 1b is supported as shown in FIG. 2 to be able to permit a pair of plinthes 27a, 27b disposed respectively in the position of each of the uprights 2 only of the transferring and return back motions $c$, $c'$, $f$, $f'$. The mode of supporting is shown in FIGS. 7 and 8. In the illustrations, only the plinth 27b on one side (rear side) is shown, but the plinth 27a on the other side is the same, so that hereunder the plinth 27b will be explained. And in the illustrations, 28 is guide rollers for receiving the feed bar 1b, 29 is guide rollers for holding the feed bar 1b therebetween from the sides thereof, 30 is guide roller for pressing the feed bar 1b. The feed bar 1b is permitted only of the transferring and return back motions $c$, $c'$, $f$, $f'$ with respect to the plinth 27b, and the plinth 27b is supported to be only movable up-and-down by two elevating rods 33a, 33b with respect to carriage 32 reciprocatable only in the widthwise direction of the route by means of a pair of guide rollers 31. Each of the elevating rods 33a, 33b has rack portion 34 and a set of pinion gears 35a, 35b meshing with both the rack portions 34 while meshing with each other are born on the carriage 32 only to be rotatable, and only the pinion gear 35a is fitted on the splined shaft portion 37 of rotary shaft 36 passing through the carriage 32 in the direction of reciprocating motion to be slidable only in the axial direction. And, to rotary shaft 38 disposed to pass through the carriage 32 parallel with said rotary shaft 36 is provided with male screw threaded shaft portion 39 [ball screw or the like] at an extent corresponding to said splined shaft portion 33, and female screw threaded body 40 engageable with the male screw is secured to the carriage 32. And, with these two rotary shafts 36 38 engages a carriage supporting the plinth 27a on the other side (front side) as mentioned above, but the male screw threaded portions 39 are constructed to have a reversed screw respectively, and thereby both carriage 32, that is, the plinthes 27a 27b are constructed to be approached or retreated simultaneously by rotating the rotary shaft 38. And, two rotary shafts 36 38 arranged for every upright 2 as above mentioned, are born with stationary frame 41 at both ends thereof (when required, the intermediate portion thereof may be included) and on the ends thereof at the rear side with respect to the route A, that is, the side of the plinth 27b are mounted pinion gears 42 43 respectively. In the illustrations, 44 45 are racks for driving the rotary shaft 36 38 by the reciprocating motion in the direction of the route A through each pair of the pinion gears 42 43 and as shown in FIG. 2, they are connected at the rear side of the route A with rods 46 47 disposed between the uprights 2. Both rocks located at the end of the route A are connected with cam follower levers 48 49 through rods 46' 47' as shown in FIG. 3, the cam follower lever 48 is born at the intermediate portion thereof on the stationary frame 22 with supporting shaft 50 while cam follower roller 51 at the free end of the lever 48 is contacted against cam 52 (refer to FIG. 6), the cam follower lever 49 is born on the rotary shaft 16 to be relatively rotatable while cam follower roller 53 journaled on the intermediate thereof is contacted against cam 54. These cams 52, 54 are mounted on the cam shaft 12 as shown in FIG. 6. And, as shown in FIG. 3 the cam follower lever 48 is oscillated in the direction of the arrow *h* by the cam 52 (refer to FIG. 6) and the return back motion in the reversed direction is carried out by the traction force acting in a direction reverse to the arrow *h*, caused by the weight of the feed bars 1*a*, 1*b* and the like. And the follower lever 49 is oscillated in the direction of the arrow *i* by the cam 54 (refer to FIG. 6) and the return back motion thereof in the reversed direction is carried out by the action of fluid pressure cylinder device 55 pulling the rack 45 at the beginning end of the route in the direction of the arrow *j* as shown in FIG. 9. In the illustration, 56 is cylinder body and 57 is piston stem connected with the rack 45. And, with 45–54 described above is constructed a cam device for operating a driving device for carrying out each of the approaching and retreating motions, and the elevating and descending motions of the feed bars.

As constructed as mentioned above, when the cam follower 48 is oscillated in the direction of the arrow *h* by the cam 52, all the racks 44 are pulled in one direction through the rods 46, 48, and together therewith each of the rotary shafts 36 is rotated in the same direction, and each of the front and rear plinthes 27*a*, 27*b* is elevated by the medium of the pinion gears 35*a*, 35*b*, the rack portions 34, and the elevating rods 33*a*, 33*b*, and the feed bars 1*a*, 1*b* come to carry out synchronously the elevating motions *b*, *b'*. When the cam 52 is rotated further and the cam follower lever 45 is permitted of oscillation in a direction reverse to the arrow *h*, the feed bars 1*a*, 1*b* carry out the descending motions *d*, *d'* by means of the weight of themselves. And, when the cam follower lever 49 is oscillated in the direction of the arrow *i* by means of the other cams 54, all the racks 45 are pulled in one direction through the rods 47, 47', and together therewith each of the rotary shafts 38 is rotated in the same direction, the carriage 32 of each set is retreated from each other through the male screw threaded shaft 39 having reversed screw threads and the female screw threaded bodies 40 meshing therewith respectively and the feed bars 1*a*, 1*b* come to carry out synchronously the retreating motions *e*, *e'*. When the cam 54 is rotated furthermore, and thereby the cam follower lever 49 is permitted of the oscillation of the direction reverse to the arrow *i*, then each of the racks 45 is returned back by the urging force in the reversed direction due to the fluid pressure cylinder device 55, consequently, each of the rotary shafts 38 is rotated reversely and thereby the carriages 32 of each set are moved to approach to each other and the feed bars 1*a*, 1*b* come to carry out synchronously the approaching motions *a*, *a'*. The feed bars 1*a*, 1*b* may be constructed to carry out the approaching motions by means of the urging force of the cam 54.

The feed bars 1*a*, 1*b* are to carry out the transferring and return back motions *c*, *c'*, *f*, *f'* through the cam 13 and the cylinder device 21, the elevating and descending motions *b*, *b'*, *d*, *d'* through the cam 52, and the approaching and retreating motions *a*, *a'*, *e*, *e'* through the cam 54 and the cylinder device 55, respectively, as above mentioned, and as each of the cams 13, 52, 54 is mounted on the same shaft, by considering the shape of these cams, the feed bars 1*a*, 1*b* may be made to move three-dimensionally in the order of *a*   *f*, *a'*   *f'* as shown in FIG. 10. Work located in each process location is supported by the approaching motions *a*, *a'* of the feed bars 1*a*, 1*b*, but as the feed bars 1*a*, 1*b* per se are moved upward (lifting motion), as the support for the work, it is sufficient enough to secure supports 60 having supporting surfaces 59 to catch the four corners of the work 58 on prescribed position of the feed bars 1*a*, 1*b*. By the elevating motions *b*, *b'* of the feed bars 1*a*, 1*b* after each of the supports 60 is placed under the four corners of the work is lifted the work in each process location through each of the supports 60, and by the following successive transferring motions *c*, *c'*, each work 58 is transferred onto the next process location, and by the descending motions *d*, *d'* of the feed bars 1*a*, 1*b*, each work 58 is set down, and by the retreating motions *e*, *e'*, each support 60 is separated laterally sideways from the underside of the work. Thereafter, accompanying the return back motions *f*, *f'* of the feed bars 1*a* 1*b*, press work corresponding to each process is applied to each work 58.

EMBODIMENT 2

Then, the second embodiment of the present invention will be explained referring to FIGS. 11–18. 101 is a frame, and on the frame 101 are rested a pair of right and left moving bases 102*a*, 102*b* movable in a direction rectangular to the work transferring route A. 103 is elevation driving shaft passing through the moving bases 102*a*, 102*b* in the direction of the movement thereof and supported on the frame 101 to be only rotatable. The portions of the elevation driving shaft 103 at both ends thereof corresponding to the extent of the movement of the moving bases are splined shaft portions 104*a*, 104*b*, on the splined shaft portions 104*a*, 104*b* are fitted gears 105*a*, 105*b* engaged with the moving bases 102*a*, 102*b* and movable together therewith. And, on the moving bases 102*a*, 102*b* are attached another shafts 106*a*, 106*b* parallel with said elevation driving shaft 103, and on the shaft 106*a*, 106*b* are mounted gears 107*a*, 107*b* meshed with said gears 105*a*, 105*b* and travelling together with the moving bases 102*a*, 102*b*. 108*a*, 108*b* and 109*a*, 109*b* are elevating rods provided with rocks 110*a*, 110*b* and 111*a*, 111*b* meshed with the pinions 105*a*, 105*b* and 107*a*, 107*b*, and pass through vertically the moving bases 102*a*, 102*b*, 112*a* and 112*b* are elevating bases bridged between the upper ends of the elevating rods 108*a*, 109*a* and 108*b* 109*b*, 113 is pinion provided on the end of the elevation driving shaft 103 and with this pinion 113 is meshed a rack rod 130 movable in the direction of the work transferring route A. 114 is a reversing mechanism to move the moving bases 102*a*, 102 *b* to approach to or retreat from each other and provided with two push-and-pull rods 115, 116 disposed parallel with each other and also parallel with said elevation driving shaft 103, and pinion 119 located between the rods and meshed with racks 117, 118 formed on the rods, the push-and-pull rod 115 on one side is connected directly to the moving base 102*b* on one side and the push-and-pull rod 116 on the other side is connected to the moving base 102*a* on the other side through a push-and-pull carriage 120. The carriage 120 is connected to the push-and-pull rod 116 through a separate connecting member 121 and to the moving base 102*a* through a separate link plate 123 placed between the carriage 120 and a connector 122 formed on the inside of the moving base 102*a*. And, on one end of said push-and-pull rod 116 on one side is provided with a rack 124, and with the rack 124 is meshed a pinion 125 supported on the frame 101. 126 is another pinion provided coaxially with the pinion 125, and with the pinion 126 is meshed a rack rod 127 movable in the direction of the work transferring route A. 128 is a cylinder device urging the push-and-pull rod 116 in the leftward direction in FIG. 11 through the push-and-pull carriage 120, and will be explained later referring to the driving device thereof.

Figure 15:
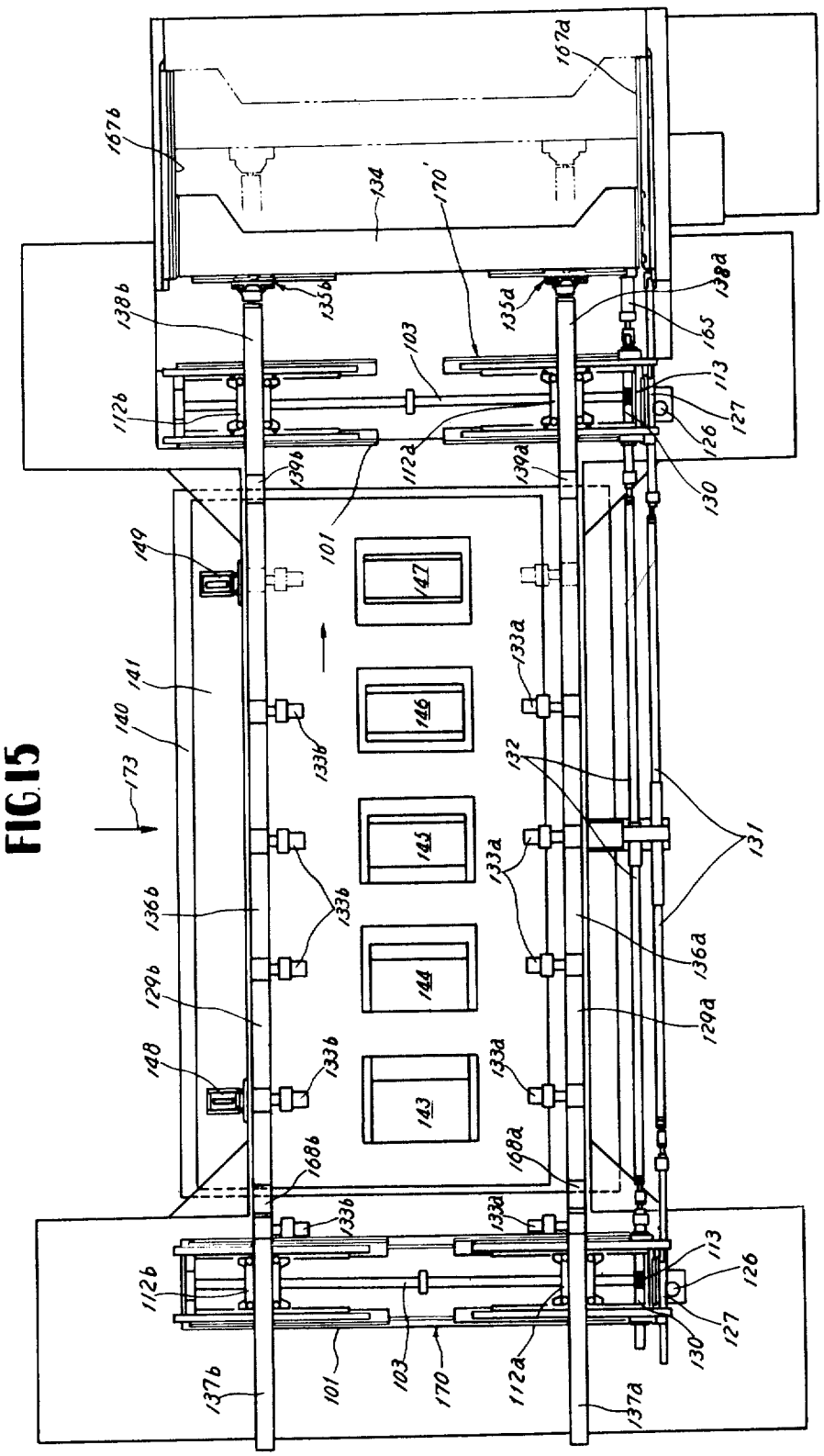

A structure 170' identical to the structure 170 described above and the structure 170 are disposed at a required interval in the direction of the work transferring route A as shown in FIG. 15, and on the elevating bases 112a, 112a and 112b 112b of both the structures 170, 170' are supported feed bars 129a and 129b to be movable only in the direction of the work transferring route A and also racks 127, 127, 130, 130 corresponding to each other in the direction of the work transferring route A are connected respectively with connecting bars 131, 132. And, on said feed bars 129a, 129b are provided clampers 133a, 133b in positions spaced at intervals equal to the distance between moulds described later, to correspond to each other in the direction rectangular to the work transferring route A. Further, said feed bars 129a, 129b are connected at one ends thereof with a carriage 134 supported on rails 167a, 167b and movable in the direction of the work transferring route A, and the connections 135a, 135b are adapted to be moved up-and-down and right-and-left with respect to the carriage 134, and the feed bars consist of intermediate portions 136a, 136b and both end portions 137a, 137b, 138a, 138b as shown in FIGS. 15 and 16, and the connections of these portions are to be situated between the structures 170, 170' with the feed bars 129a, 129b positioned as shown in FIG. 16. 168a, 139a, 168b, 139b in FIGS. 15 and 16 are connectors. On the other hand, in a position below said feed bars 129a, 129b is located a truck 140 movable to be put in and out in a direction rectangular to the work transferring route A, and on the truck 140 is provided a bolster 141, on the bolster 141 are mounted a plurality 5 of moulds 143-147 on the center line between said feed bars 129a, 129b at regular intervals in the direction of the work transferring route A. 148, 149 are supports for supporting the feed bar 129b on one side at the intermediate portion 136b thereof when disassembling the feed bar 129b, and are attached to the bolster 141.

FIG. 17 shows a driving device. This driving device is provided on the driving shaft 150 thereof with a cam 151 for moving up-and-down the feed bars 129a, 129b, a cam 152 for moving the feed bars 129a, 129b to approach to and retreat from each other, and a cam 153 for reciprocating the feed bars 129a 129b in the direction of the work transferring route A. 154, 155, 156 are oscillating levers corresponding to each of the cams 151, 152, 153, and are adapted to be osciallated around propping pins 157, 158, 159. At one ends of the oscillating levers 154, 155, 156 are provided respectively with cam rollers 160, 161, 162, and out of the three oscillating levers, the other ends of the oscillating levers 155 and 156 are connected to said rack rod 127 and the carriage 134 through link members 163 and 164 respectively, and the other end of the oscillating lever 154 is connected to said rack rod 130 through a cylinder device 165. 166 is a tension spring to contact at all times the cam roller 160 against the cam 151. And, the cam roller 161 is contacted at all times against the cam 152 by means of the traction of said cylinder device 128. And also, the cam roller 152 is to be contacted at all times against the cam 153 by means of tension spring or cylinder device as mentioned above.

And now, the action of said structures will be explained. For the convenience of explanation, FIG. 11 is to show a state just before the work 171 has been transferred in the direction of the work transferring route A by a distance equal to the interval between the moulds and is lowered at the maximum in this position to put it on the lower part of the mould 145 out of the moulds 143 – 147, and with this state, initially the clampers 133a, 133b are released. And, the oscillating lever 155 is initially rotated in the direction of the arrow in FIG. 17 by the cam 152 out of the cams 151, 152, 153 rotated all in the direction of the arrow in FIG. 17, and thereby the rack rod 127 is pulled back and the push-and-pull rod 116 is moved rightward in FIG. 11. Then, the push-and-pull rod 115 on the other side is also moved leftward by the same extent, and separates the moving bases 102a, 102b from each other, and the clampers 133a 133b are parted from the work 171. Thereby, the work 171 is put on the lower part of the mould 147. Thereafter, while press work is being applied to the work 171, the oscillating lever 156 is rotated in the direction of the arrow in FIG. 17 by the cam 153, the feed bars 129a, 129b are retreated by a distance equal to the interval between the moulds in a direction opposite to the work transferring route A. And, with this state, the oscillating lever 155 is rotated in the direction reverse to that mentioned above by the cam 152, the rack rod 127 is advanced, and the moving bases 102a, 102b are advanced through the reversing mechanism 114 by a prescribed distance, that is, to a position permitting the clampers 133a, 133b to clamp the work on the lower part of the mould 144. With this condition, the work is clamped by the clampers 133a, 133b. Thereafter, the oscillating lever 154 is rotated by the cam 151 in the direction of the arrow in FIG. 17 and the rack rod 130 is retreated by a prescribed extent, and thereby the elevation driving shaft 103 is rotated leftward in FIG. 12 and the pinions 105a, 105b and 107a, 107b are rotated in the direction of the arrow in FIG. 12. And, thereby the elevating rods 108a, 108b and 109a, 109b are elevated, and the feed bars 129a and 129b are lifted by a prescribed extent. Then, the feed bars 129a, 129b are advanced by a distance equal to the interval between the moulds by means of the cam 153, and in this position, the work is transferred onto the lower part of next mould by the advance of the rack rod 130 caused by the cam 151, and hereinafter, with similar operation, a prescribed number of press works are completed.

And also, in this embodiment, a cylinder device in interposed in the power transmitting portion for rotating the elevation driving shaft 103 by receiving the motion of said oscillating lever 154, that is, between the oscillating lever 154 and the rack rod 130 and power transmission is to be carried out through this cylinder device 165.

When the cylinder device 165 is provided like this, effect as shown hereunder may be obtained. Namely, with the elevating bases 112a, 112b lowered at the maximum, the cylinder device 165 is adjusted previously to have a gas between the elevating bases 112a, 112b and the moving bases 102a, 102b as shown in FIG. 12. On the other hand, when the moulds 143-147 are to be replaced, it is required to move the truck 140 in the direction of the arrow in FIG. 15, and therefore the feed bar 129b on one side impeding the replacement of the moulds must be removed. In such a case, with the feed bars 129a, 129b retreated by the maximum, that is, the elevating bases 112a, 112b lowered by the maximum to bring the intermediate portion 136b of the feed bar 129b inbetween the structures 170, 170' as shown in FIG. 11, the intermediate portion 136b of the feed bar 129b may be put on the supports 148, 149 on the side of the bolster 141 in the range of said gap 172 by extending said cylinder device 165. Consequently, thereafter the connectors 168b, 139b on the side of the feed bar 129b may be detached and also the intermediate portion 136b may be removed together with the truck 140. Namely, in consequence of the provision of the cylinder device 165, the intermediate portion 136b of the feed bar 129b may be removed without any special device.

And, in this embodiment, by interposing a power transmission means 174 changeable in length thereof in the power transmission system for transmitting the motion of said oscillating lever 155 to the rack rod 127, to be concrete, inbetween the link member 163 and the rack rod 127, the distance between the moving bases 102a, 102b, that is, the extent of the travel of the feed bars 129a, 129b in the direction rectangular to the work transferring route A is adapted to be varied optionally. And then, this means will be explained in detail referring to FIG. 18. In FIG. 18, 175 is a screw stock connected at one end thereof to the rack rod 127, and the screw stock 175 is connected at one end thereof to the link member 163 through a rotary coupling 176 and a cylindrical nut body 179 supported rotatably on two bearings 177, 178 is screwed adjustably on the screw stock 175 and thereby the link member 163 and the rack rod 127 are connected together. And, on the nut body 179 is fitted between said two bearings 177, 178 a rotary body 180 prevented from moving axially. And the nut body 179 is adapted to be slidable axially by dint of the engagement of key 181 and key way 182 provided on the nut body 179 and the rotary body 180 respectively. And, for the rotary body 180, a driving device comprising a motor 183, a reduction gear 184 and a wrapping connector 185 for receiving rotation from the reduction gear 184 is provided.

In the structure mentioned above, the nut body 179 is rotated by rotating the rotary body 180 in any direction to adjust the position of screwed engagement between the nut body 179 and the screw stock 175, and thereby the gap between the link member 163 and the rack rod 127 may be adjusted optionally. Therewith, the position of meshing of the rack rod 127 with the pinion 126 is changed, and by that extent of the change, the push-and-pull rod 116 may be advanced or retreated, and thereby the extent of the movement of the feed bars 129a 129b in the direction rectangular to the work transferring route A may be changed according to the width of the work 171.

And, as shown in FIG. 17, cam 153 driving oscillating lever 156 is provided with up-grade portion and down-grade portion symmetrically with respect to axis of rotation. In such a case, it is preferable to construct as shown with virtual line in FIG. 17. Namely, another oscillating lever 186 is pivoted with shaft 187 symmetrically to the oscillating lever 156 with respect to the axis of rotation of the cam 153, and on the oscillating lever 186 is journaled with cam roller 188 spacing the axes of the cam roller 188 and the shaft 187 with a distance equal to that between the axes of the cam roller 162 and the shaft 159 in the oscillating lever 156. And, a cylinder device 189 urging the oscillating lever 156 in a direction to contact the cam roller 162 against the cam 153 and a cylinder device 190 urging the oscillating lever 186 in a direction to contact the cam roller 188 against the cam 153 are provided, and the pressure chambers 189a, 190a of these cylinder devices 189, 190 are intercommunicated with communicating pipe 191. Hereupon, the distance between the axis of the point 192 of the piston stem of the cylinder device 189 pivoted to the oscillating lever 156 and that of the shaft 159 and the distance between the axis of the point 193 of the piston stem of the cylinder device 190 pivoted to the oscillating lever 186 are equal with each other. And, both the cylinder devices 189, 190 are of the same standard. And, the internal pressure in the sealed oil passage system of the pressure chamber 189a-the communicating pipe 191-the pressure chamber 190a is maintained constant at all times with a suitable means not shown.

When constructed like this, as the oscillating lever 156 is moved outward by means of the butting action of the up-grade portion of the cam 153 and the cam roller 162, the fluid pressured in the pressure chamber 189a of the cylinder device 189 is bed into the pressure chamber 190a of another cylinder device 190 and moves urgingly the oscillating lever 180 to the side of the cam 153, and thereby the cam roller 188 is butted urgedly against the down-grade portion of the said cam 153. Accordingly, the torque opposite to the direction of rotation, acted on the cam 153 by the reaction caused by the butting of the cam roller 162 and the up-grade portion of the cam 153 is equal with the torque in the direction of rotation, acted on the cam 153 by the butting of the cam roller 188 and the down-grade portion of the cam 153, and both the torques are cancelled with each other. And, the torque opposite to the direction of rotation, acted on the cam 153 by the reaction caused by the butting of the cam roller 188 and the up-grade portion of the cam 153 is generated by the action that the fluid pressured in the pressure chamber 190a urges the oscillating lever 156 to the side of the cam 153, and is cancelled with the torque in the direction of rotation of the cam 153 accompanying the butting of the cam roller 162 and the downgrade portion of the cam 153.

Therefore, the load when driving the cam 153 is maintained substantially constant, and the cam driving torque may be reduced as compared with the case when the cam roller 162 is urged against the cam 153 only with the cylinder device 189.

And, when only the cylinder device 189 is used, to maintain constant the urging force of the cam roller 162 against the cam 153, an accumulator absorbing the variation of the pressure within the pressure chamber 189a is required, but with the construction mentioned above a means feasible to make up the pressure drop in the sealed oil passage system of the pressure chamber 189a-the communicating pipe 191-the pressure chamber 190a is sufficient enough.

Further, it is safe because there is no fear of that the oscillating lever 156 continues spontaneously to be moved to a point consuming completely the torque to be applied to the cam 153, even if the cam shaft is not secured by braking particularly when the cam 153 is stopped.

We claim:

1. Feed bar driving device of solid transfer press making the feed bars disposed on both side of work transferring route feasible to carry out approaching and retreating motion with respect to the route, up-and-down motion, and transferring and returning back motion in the direction of the route, and comprising a pair of carriages (32, 102a, 102b) reciprocable across the work transferring route in prescribed position in the direction of the route; bases (27a, 27b, 112a, 112b) mounted respectively on the carriages to be movable up-and-down; carriage driving means for moving the carriages oppositely to approach a retreat from each other and having driven pinion gears (43, 126) only at one side of said route; pinion gear (35a, 108a) held on each of said carriages to be only rotatable and engageable with vertical rack gears (34, 110a, 110b) connected to the side of each of said bases; rotary shafts (63, 103) disposed in the direction across the route, fitted thereon with pinion gears of both the carriages to be slidable only axially and having driven gears (42, 113) only on the same side as the side of said driven pinion gears (43, 126); rack gears (45, 127) disposed on one side of said route to be reciprocable in the direction of the route and meshed with said driven gears (43, 126); racks gears (44, 130) disposed similarly and meshed with said driven pinion gears (42, 113); carriages (5, 134) movable in the direction of said route, connected together through the one ends on the same sides of a pair of the feed bars (1a, 1b, 136a, 136b) supported respectively on both said bases to be reciprocable only in the direction of said route and the means (10, 135a, 135b) permitting the feed bars to move up-and-down and to move to approach to and retreat from each other; and cams (13, 52, 54, 151, 152, 153) and cam follower levers (15, 48, 49, 154, 155, 156) disposed at one end of said route and driven with driving shaft (12, 150) disposed in the direction across the route to reciprocate the carriages and said two rack gears (45, 127, 42, 113).

2. Feed bar driving device for transfer press wherein the carriage driving means in claim 1 is disposed in the direction across said route and includes rotary shaft (38) having said driven pinion gear (43) at one end thereof, and the rotary shaft is provided with screw threaded portions (39) engaged respectively with both the carriages (32, 32) and opposite to each other in transferring direction.

3. Feed bar driving device of transfer press wherein the carriage driving means in claim 1 includes rack gear (124) reciprocated in the direction across the route by the rotation of said driven pinion gear (126) and movable members (115) interlocked to move oppositely against the rack gear (124) by means of moving direction reversing means (118, 119, 117), and said rack gear (124) is connected interlockedly to the carriage (102a) on one side and the movable member (115) is connected interlockedly to the carriage (102b) on the other side.

4. Feed bar driving device of transfer press comprising interposition of connecting means (165) changeable in length between rack gear (130) for moving the feed bars up-and-down and cam follower lever (154) for reciprocating the rack gear (130) in claim 1.

5. Feed bar driving device of transfer press comprising interposition of connecting means (174) changeable in length between rack gear (127) for moving a pair of feed bars to approach to and retreat from each other and cam follower lever (155) for driving the rack gear (127) in claim 1.

6. Feed bar driving device of transfer press comprising addition of cam driving torque reducing means including another cam follower lever (186) carrying out an exactly opposite motion with respect to the axis of cam against cam follower lever (156) cooperating with cam (153) provided with up-grade portion and down-grade portion symmetrically with respect to the axis of rotation out of the cam in claim 1; cylinder device (189, 190) urging respectively both the cam follower levers (156, 186) against the cam (153); and communicating pipe (191) intercommunicating the pressure chambers (189a, 190a) of both the cylinder devices (189, 190).

* * * * *